(12) United States Patent
Chigira et al.

(10) Patent No.: US 6,388,640 B1
(45) Date of Patent: *May 14, 2002

(54) HEAD MOUNT DISPLAY

(75) Inventors: Tatsuo Chigira, Yokohama; Kenji Miyauchi, Tokyo; Hironori Takano, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,775

(22) Filed: Dec. 30, 1998

(30) Foreign Application Priority Data

Jan. 9, 1998 (JP) .......................... 10-014971
Jan. 9, 1998 (JP) .......................... 10-014972

(51) Int. Cl.⁷ .............................. G09G 5/00
(52) U.S. Cl. ................. 345/8; 359/13; 349/11
(58) Field of Search .................. 345/7, 8; 349/11; 359/13, 630, 632

(56) References Cited

U.S. PATENT DOCUMENTS 6,034,653 A  *  3/2000  Robertson et al. .......... 345/8
6,144,347 A  * 11/2000  Mizoguchi et al. .......... 345/8

FOREIGN PATENT DOCUMENTS

| JP | 7-84210 | 3/1995 | |
| JP | 7-181422 | 7/1995 | |
| JP | 7-333547 | 12/1995 | |
| JP | 10-293544 | * 11/1998 | ............. G09F/9/00 |
| JP | 10-197825 | * 6/1999 | ............. G02B/27/02 |
| JP | 11-155115 | * 6/1999 | ............. H04N/5/64 |

\* cited by examiner

*Primary Examiner*—Amare Mengistu
(74) *Attorney, Agent, or Firm*—Fitzpatrick, Cella, Harper & Scinto

(57) ABSTRACT

A user changes the shapes of the side frames from the shapes at the positions indicated by dashed lines at which no external force is applied to those at the positions indicated by dashed lines, and mounts the side frames on the head. As a result, the side frames and rear mount pads perfectly fit on the head, as indicated by solid lines. The user therefore can see video on a main body of a display unit in a natural state without any strain.

41 Claims, 13 Drawing Sheets

HEAD MOUNT DISPLAY

BACKGROUND OF THE INVENTION

1. Field of the Invention

The present invention relates to a head mount display having a visual apparatus to be mounted on the head of a user to allow him/her to see video.

2. Related Background Art

A visual apparatus called a head mount display that is mounted on the head of a user to allow him/her to see the video displayed on a display unit is disclosed in Japanese Patent Application Laid-Open Nos. 7-84210, 7-181422, and 7-333547. This head mount display is used to enjoy video or the like with a sense of reality in an arbitrary place without influencing the surroundings, and hence is required to be lightweight, comfortable to wear, and excellent in portability.

(1) The head mount display in Japanese Patent Application Laid-Open No. 7-84210 is a mount apparatus having a mount portion whose rear portion is cut. According to this apparatus, a press support member using an elastic member made of a metal, synthetic resin, or the like is pressed against the head of the user. With this operation, the user can wear the apparatus comfortably without any restraint felt at the back of the head. In addition, the apparatus can be easily attached/detached on/from the head of the user from the front.

(2) The head mount display in Japanese Patent Application Laid-Open No. 7-181422 is designed such that the mount unit surrounds the head of the observer. This mount unit is biased to the sides of the head to fix it on the head.

(3) The video display apparatus in Japanese Patent Application Laid-Open No. 7-333547 has a display unit mounted on a mount frame, and a movable frame mounted on the mount frame. With this structure, this movable frame is biased to fix the apparatus on the head of the user.

FIG. 15 is a side view of another conventional head mount display. An image display unit 101 is coupled to a mount member 103 through a support member 102 having two hinges 102a and 102b. A forehead pad 104 is mounted on the mount member 103. The forehead pad 104 is comprised of a pad 105a, a pad base 105b, and a base 106.

When this apparatus is to be used, the mount member 103 is mounted on an observer S, and the pad 105a of the forehead pad 104 is brought into contact with the forehead of the observer. In this case, visual axis adjustment between the image display unit 101 and an eyeball of the observer is performed by using the two hinges 102a and 102b.

SUMMARY OF THE INVENTION

According to the conventional head mount display (1), although easy mounting and elimination of discomfort from the head can be realized, the pressing force adjustment mechanism attached to the press support member increases the weight of the apparatus and hampers comfort in wearing the apparatus. In addition, owing to the frame partly cut and shaped to surround the head, the apparatus becomes large in size. This interferes with portability that allows the user to enjoy video in an arbitrary place.

In addition, since the press support member made of an elastic member such as a metal or synthetic resin member is pressed against the head to fix the apparatus on the head, if a synthetic resin or the like is used, the press support member creeps after a long period of use, and the biasing force needs to be sequentially adjusted. Eventually, the necessary biasing force may not be obtained. Assume that a metal is used for the press support member. In this case, since no caution is exercised in selecting the material and cross-sectional shape, if the press support member is spread when the user wears the apparatus on his or her head, the internal stress exceeds the elastic limit, resulting in a loss of biasing force. Likewise, adjustment for spring force is sequentially required, and the necessary biasing force may not be obtained eventually.

According to the head mount display (2), since the display unit is fixed on the head of the observer with the headband-like mount unit, it is troublesome to properly wear the apparatus. In addition, the display unit is relatively heavy, and the display unit must be fixed on the head with a strong force. This gives the observer a sense of restraint, and the observer's hair curls in a wrong way when he/she wears the apparatus.

The video display apparatus (3) can be mounted on the head of the user from the front of the face and hence has good portability. Since this apparatus does not compress the entire perimeter of the head, no sense of restraint is locally produced. However, the movable frame is biased against the head, and the mount frame receives the repulsion of the basing force. For this reason, the mount frame must have high rigidity. As a result, the frame becomes heavy, impairing the comfort upon wearing the apparatus.

It is an object of the present invention to provide a lightweight head mount display which solves the above problems, can be easily mounted on the head of a user, and has high portability.

In order to achieve the above object, a head mount display comprising a display unit having a display element and optical means for enlarging/displaying an image on the display element, a first frame extending substantially conforming to a forehead of a user, first support portion mounted on the first frame at a predetermined angle, and support means for supporting the display unit on the first frame, wherein the first frame is formed by bending a metal rod, metal pipe, or metal plate, first and second hinges are mounted on two end portions of the first frame, the other end of each of the first and second hinges supports a corresponding one of first and second side frames, which respectively have second and third support portions, have shapes bent inwardly, and have elasticity in a direction in which the first and second side frames bend, to allow each of the side frames to rotate in a direction of the head, and the first, second, and third support portions are biased with biasing forces produced by spreading the first and second side frames, thereby producing a force that allows the pads to be worn on the head.

According to the present invention, there is provided a head mount display comprising a display unit having a display element and optical means for enlarging/displaying an image on the display element, a first frame extending substantially conforming to a forehead of a user, first support portion mounted on the first frame at a predetermined angle, and support means for supporting the display unit on the first frame, wherein the first frame is formed by coating a core member obtained by bending a metal rod, metal pipe, or metal plate with a resin film, first and second hinges are mounted on two end portions of the first frame, the other end of each of the first and second hinges supports a corresponding one of first and second side frames, which respectively have second and third support portions, have shapes bent inwardly, and have elasticity in a direction in which the first and second side frames bend, to allow each of the side frames to rotate in a direction of the head, and the first, second, and third support portions are biased with biasing forces produced by spreading the first and second side frames, thereby producing a force that allows the pads to be worn on the head.

According to the present invention, there is provided a head mount display comprising a display unit having a display element and optical means for enlarging/displaying an image on the display element, a first frame extending substantially conforming to a forehead of a user, first support portion mounted on the first frame at a predetermined angle, and support means for supporting the display unit on the first frame, wherein the first frame is formed by bending a metal rod, metal pipe, or metal plate, first and second hinges are mounted on two end portions of the first frame, the other end of each of the first and second hinges supports a corresponding one of first and second side frames, which have shapes bent inwardly and have elasticity in a direction in which the first and second side frames bend, to allow each of the side frames to rotate in a direction of the head, the first and second side frames respectively have third and fourth hinges mounted on end portions different from the end portions coupled to the first and second hinges, first and second press members respectively having second and third support portions are respectively supported on the third and fourth hinges to be rotatable in a direction of the head, and the first, second, and third support portions are biased with biasing forces produced by spreading the first and second side frames, thereby producing a force that allows the pads to be worn on the head.

According to the present invention, there is provided a head mount display comprising a display unit having a display element and optical means for enlarging/displaying an image on the display element, a first frame extending substantially conforming to a forehead of a user, first support portion mounted on the first frame at a predetermined angle, and support means for supporting the display unit on the first frame, wherein the first frame is formed by bending a metal rod, metal pipe, or metal plate, first and second hinges are mounted on two end portions of the first frame, the other end of each of the first and second hinges supports a corresponding one of first and second side frames, which have shapes bent inwardly and have elasticity in a direction in which the first and second side frames bend, to allow each of the side frames to rotate in a direction of the head, the first and second side frames respectively have first and second elastic members mounted on end portions different from the end portions coupled to the first and second hinges, first and second press members respectively having second and third support portions are respectively supported on the first and second elastic members to be foldable in a direction of the head, and the first, second, and third support portions are biased with biasing forces produced by spreading the first and second side frames, thereby producing a force that allows the pads to be worn on the head.

The head mount display that obtains a biasing biasing force of the elastic side frames can be made lightweight as a whole, and comfortable to wear. In addition, this apparatus is easy to wear and realizes excellent portability.

The head mount display uses the side frames coated with a resin and hence gives the user a soft feel when the support portion comes into contact with the head of the user. Even a person having an allergy to metals can use the display for a long period of time.

The head mount display having the frames and press member that can be folded in two is comfort to wear. This apparatus can be folded into a very compact structure and hence can improve the portability.

The head mount display designed to be folded in two by using the elastic members and press members is more comfortable to wear. This apparatus can be folded into a compact structure and hence can improve the portability.

The conventional apparatus shown in FIG. 15 uses one hinge 102b to adjust the visual axis height between the image display unit 101 and the eyeball. If the visual axis of the observer S matches a position where the forehead pad 104 approaches the displayed image in terms of height, the image display unit 101 pivots on the hinge 102a on the mount member 103 side to move to the position indicated by a chain double-dashed line 101' away from the eyeball. As a result, the weight moment of the image display unit 101 increases to give the observer S a sense of heaviness, and the observer will suffer from fatigue after a long period of use.

When a plurality of observers S are to use one display apparatus, each observer S must adjust the visual axis height every time he/she uses it in order to adjust the visual height in accordance with each observer S. This is inconvenient when each observer wants to immediately observe video. In addition, even if only one observer S is to use the apparatus, the visual axis height easily goes out of adjustment upon reception of an external force or the like.

It is another object of the present invention to provide a head mount display apparatus which solves the above problems and can be worn stably without changing the weight moment by keeping the distance between the eyeballs and the forehead pad constant.

In order to achieve this object, according to the present invention, there is provided a head mount display apparatus comprising a display unit including a display element and optical means for enlarging and displaying an image on the display element, and mount means for mounting the display unit on a front surface of a head of a user, wherein the mount means has a mount pad that comes into contact with a forehead of the user at least upon being mounted, and the mount pad is movable in a direction of height with respect to the display unit to allow adjustment of a position where the mount pad comes into contact with the forehead of the user.

In addition, according to the present invention, there is provided a head mount display apparatus comprising a display unit including a display element and optical means for enlarging and displaying an image on the display element, and mount means for mounting the display unit on a front surface of a head of a user, wherein the mount means has a mount frame supporting the display unit and a mount pad that is supported by the mount frame and comes into contact with a forehead of the user upon being mounted, and the mount pad is movable in a direction of height with respect to the display unit to allow adjustment of a position where the mount pad comes into contact with the forehead of the user.

In using the head mount display apparatus, the user can adjust the visual axis between the image display unit and the eyeballs by vertically moving the mount pads without moving the display unit. The user can therefore adjust the visual axis optimally and easily while observing the image. Since the display unit does not move back and force with respect to the user, the distance between the eyeballs and the mount means is kept constant, and the user can wear it stably without any change in weight moment. In addition, since the visual axis adjustment unit can be assembled from a small number of parts, reductions in the number of assembly steps and weight can be attained. This apparatus can maintain an optimal visual axis adjustment position for the user for a long period of time with easy adjustment.

Furthermore, when this head mount display apparatus is to be used by a plurality of users, even if the display unit is not adjusted to the optimal position for the eyes of each user, he/she can easily re-adjust the display unit to the optimal adjustment position for his/her eyes.

DETAILED DESCRIPTION OF THE PREFERRED EMBODIMENTS

The present invention will be described in detail below with reference to the accompanying drawings.

Figure 1:
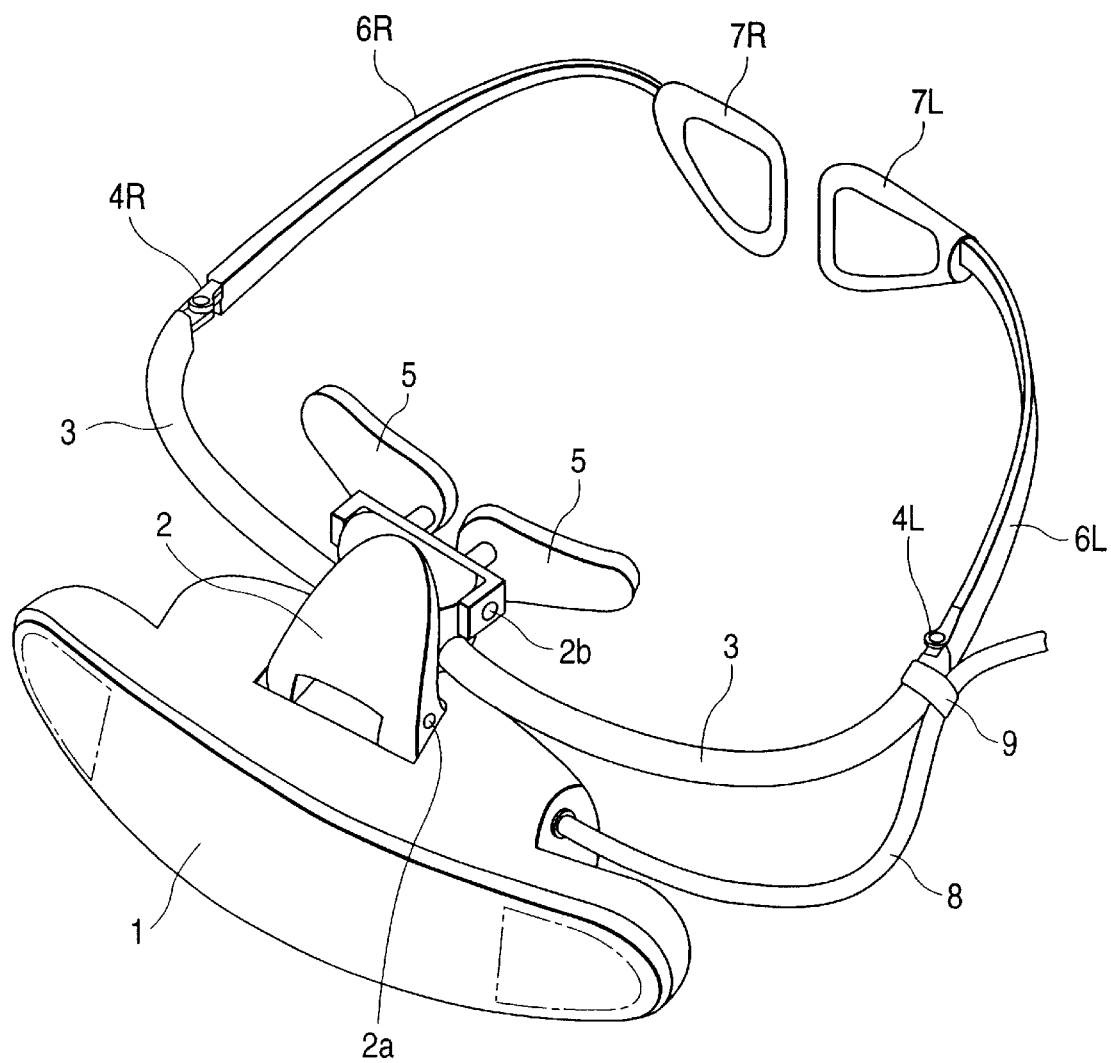
FIG. 1 is a perspective view of the first embodiment of the present invention.
Figure 2:
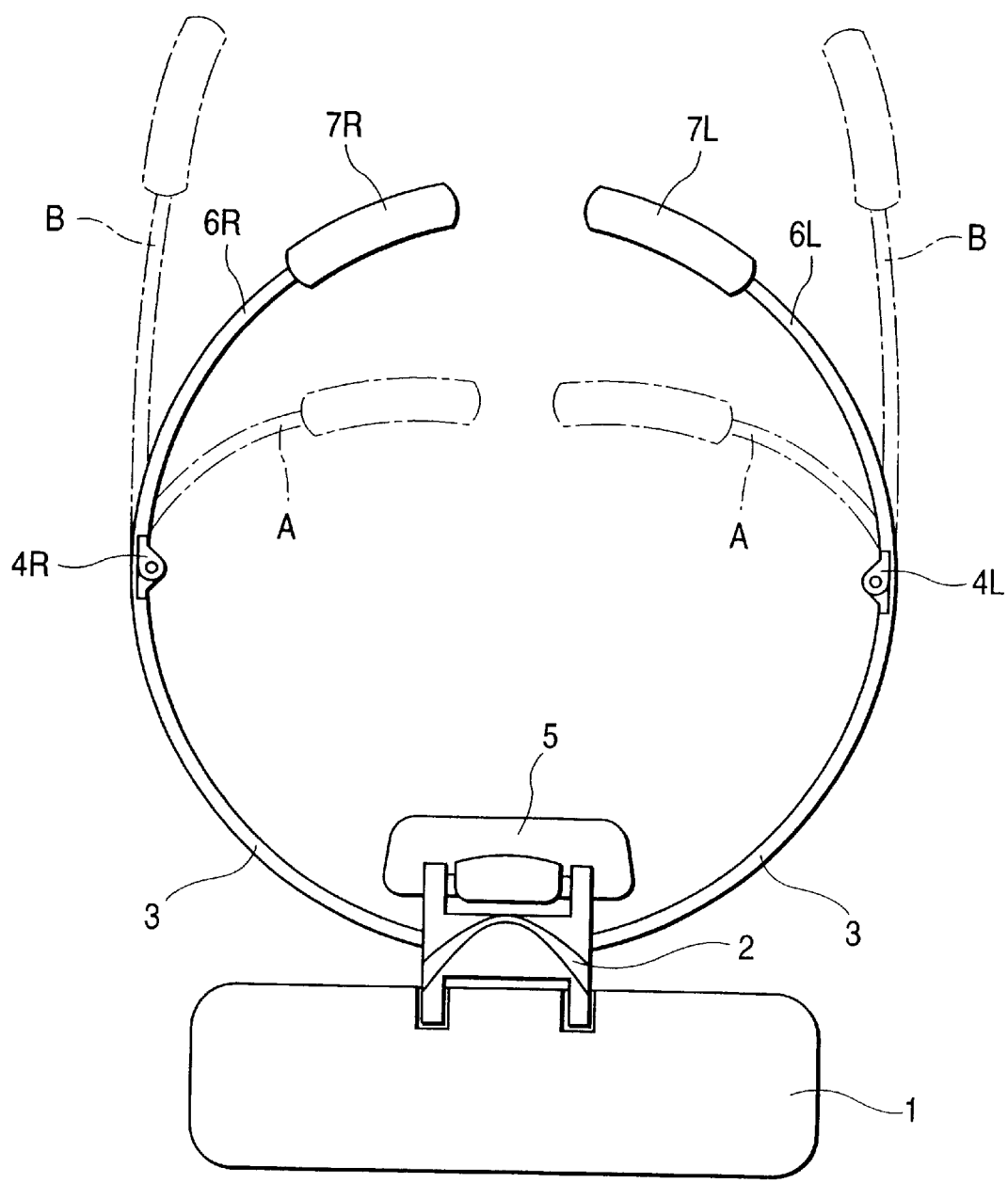
FIG. 2 is a plan view of the embodiment.
Figure 3:
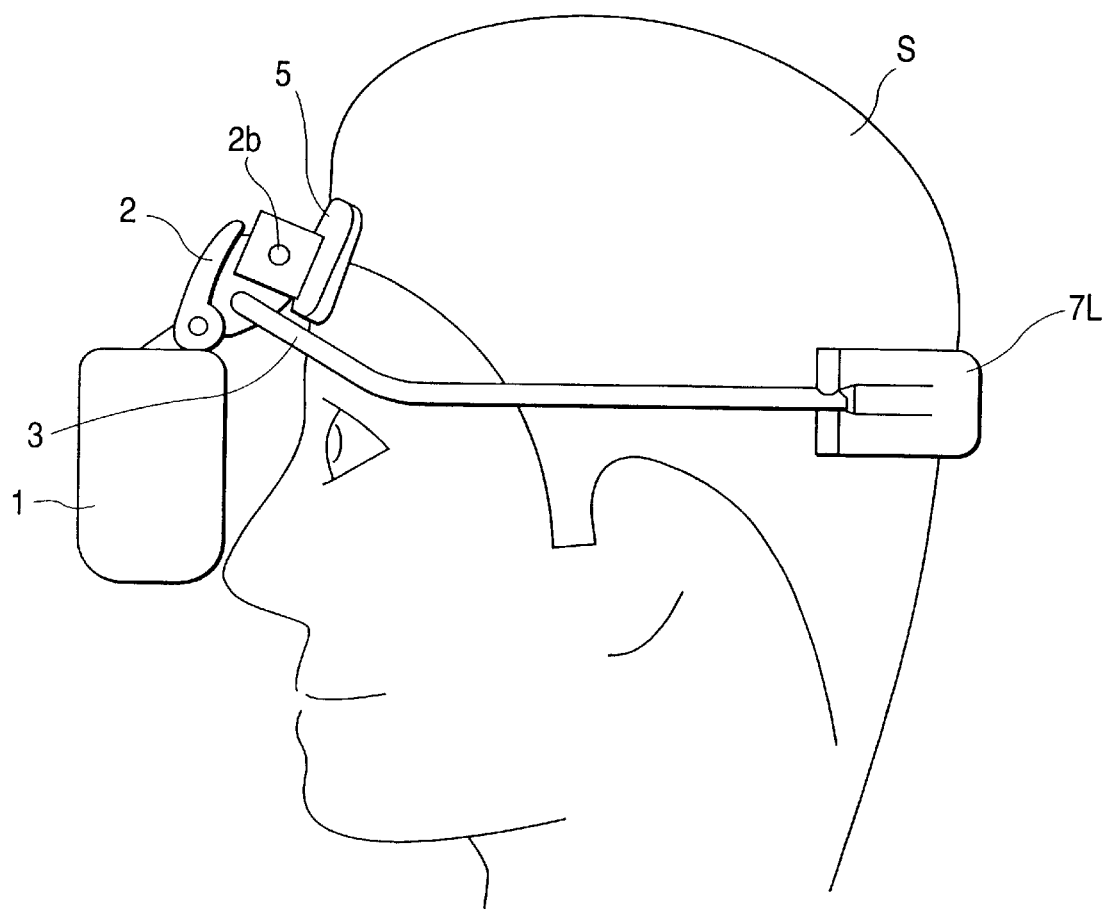
FIG. 3 is a side view of the embodiment in a mounted state.

FIG. 1 is a perspective view of the first embodiment. A main body 1 of a display unit incorporates a backlight, a liquid crystal panel, a display circuit, and an optical means. The main body 1 is fixed to a front frame 3 with screws, by brazing, or the like through a support member 2 made of, e.g., a synthetic resin or titanium. For example, the front frame 3 is formed by bending a titanium rod member to have a shape almost conforming to the front surface of the head of a user S, as shown in FIGS. 2 and 3. The support member 2 is fixed to substantially the middle of the front frame 3 with screws or the like. In addition, hinges 4L and 4R are fixed to the two ends of the front frame 3 by brazing, caulking, or the like.

The support member 2 has pivots 2a and 2b at two positions. The main body 1 is axially supported by the pivot 2a to be rotatable back and forth with a predetermined frictional force with respect to the user S. For example, two front mount pads 5 are axially supported by the pivot 2b to be pivotal vertically within a predetermined angular range with respect to the user S. A spring (not shown) is hooked between the support member 2 and the front mount pads 5 so the front mount pads 5 is biased downward, with respect to the user, around the pivot 2b of the support member 2.

Each of side frames 6L and 6R made of, e.g., a stainless steel alloy, titanium, a titanium alloy, or a super-elastic alloy is coupled to the other end of a corresponding one of the hinges 4L and 4R. The side frames 6L and 6R are bent in the form indicated by dashed lines A in FIG. 2 before the frames are mounted on the head of the user. The side frames 6L and 6R are axially supported by the hinges 4L and 4R to be pivotal within predetermined angular ranges with respect to the front frame 3. Each of rear pads 7L and 7R is mounted on the other end of a corresponding one of the side frames 6L and 6R.

The hinges 4L and 4R are mounted at positions where the side frames 6L and 6R are located on the extended lines of the front frame 3 and the two end faces of the front frame 3 come into contact with the end faces of the side frames 6L and 6R. The side frames 6L and 6R cannot be spread outwardly from the extended lines of the front frame 3 but can be folded inwardly.

Figure 4:
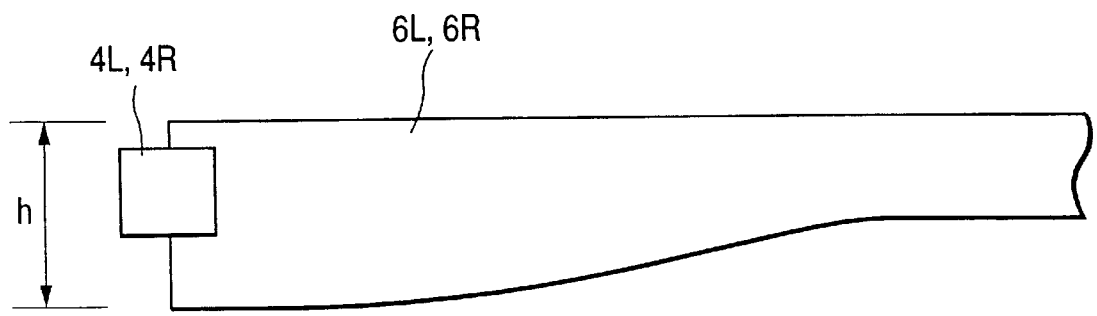
FIG. 4 is a side view of a side frame.
Figure 5:
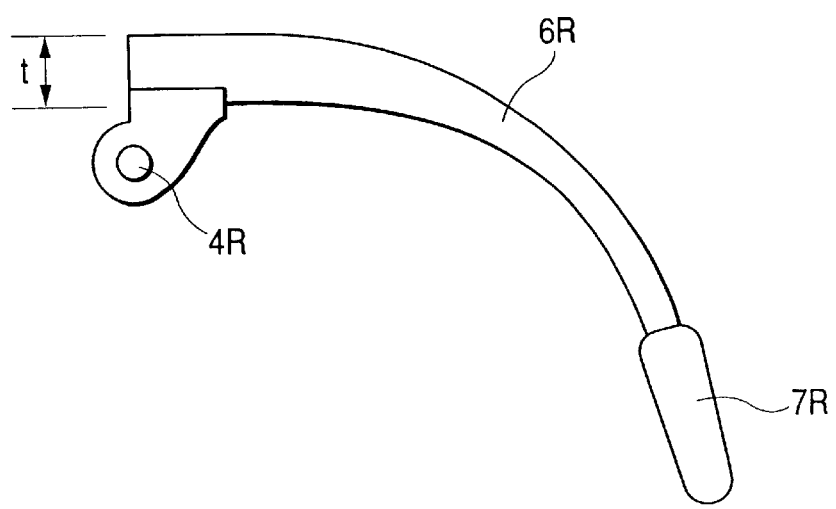
FIG. 5 is a plan view of the side frame.

The side frames 6L and 6R are shaped to be softer and more elastic than the front frame 3. More specifically, as shown in FIG. 4, each of the hinges 4L and 4R gradually decreases in height h rearward toward the position at which it is fixed. In addition, as shown in FIG. 5, each of the hinges 4L and 4R gradually increases in thickness t rearward toward the position at which it is fixed.

Furthermore, a cable 8 extending from a video tape deck, personal computer, or the like (not shown) is connected to the main body 1. The cable 8 is fixed to the side frame 6L with a hook 9.

At the positions indicated by the dashed lines A in FIG. 2, no external force acts on the side frames 6L and 6R. When the user S wants to wear the side frames 6L and 6R, he/she change the shapes of the side frames 6L and 6R from those at these positions to those at the positions indicated by dashed lines B in FIG. 2. At this time, the front frame 3 hardly deforms because it has higher rigidity than the side frames 6L and 6R. In addition, internal stress is produced in the side frames 6L and 6R to become a biasing force. However, since the cross-sectional areas of the portions of the side frames 6L and 6R which are located near the hinges 4L and 4R are larger than those of the portions of the side frames 6L and 6R which are located far from the hinges 4L and 4R, this internal stress is dispersed. This prevents the sprint properties of the side frames 6L and 6R from being impaired beyond the elastic limit.

When the user S wears the head mount display, the side frames 6L and 6R and the rear pads 7L and 7R are located at the positions indicated by the solid lines in FIG. 2. As a result, the head mount display fits on the head of the user S, as shown in FIG. 3. If a person having a small head wears this display, the pressure on the head decreases so the display may become loose. In contrast to this, if a person having a large head wears the display, the pressure becomes so high that the user has a headache. However, these problems can be solved by using a material having a low Young's modulus and a high elastic limit, such as a stainless steel alloy, titanium, a titanium alloy, or a super-elastic alloy for the side frames 6L and 6R. Any user can therefore wear the display comfortably to his/her satisfaction regardless of the size of the head. In addition, the user can carry this display with the side frames 6L and 6R being folded inward at the hinges 4L and 4R, thus making the overall apparatus compact in size.

The user S wears this head mount display to watch video displayed on the main body 1 on the basis of a signal from a video signal generating means such as a video tape deck.

Figure 6:
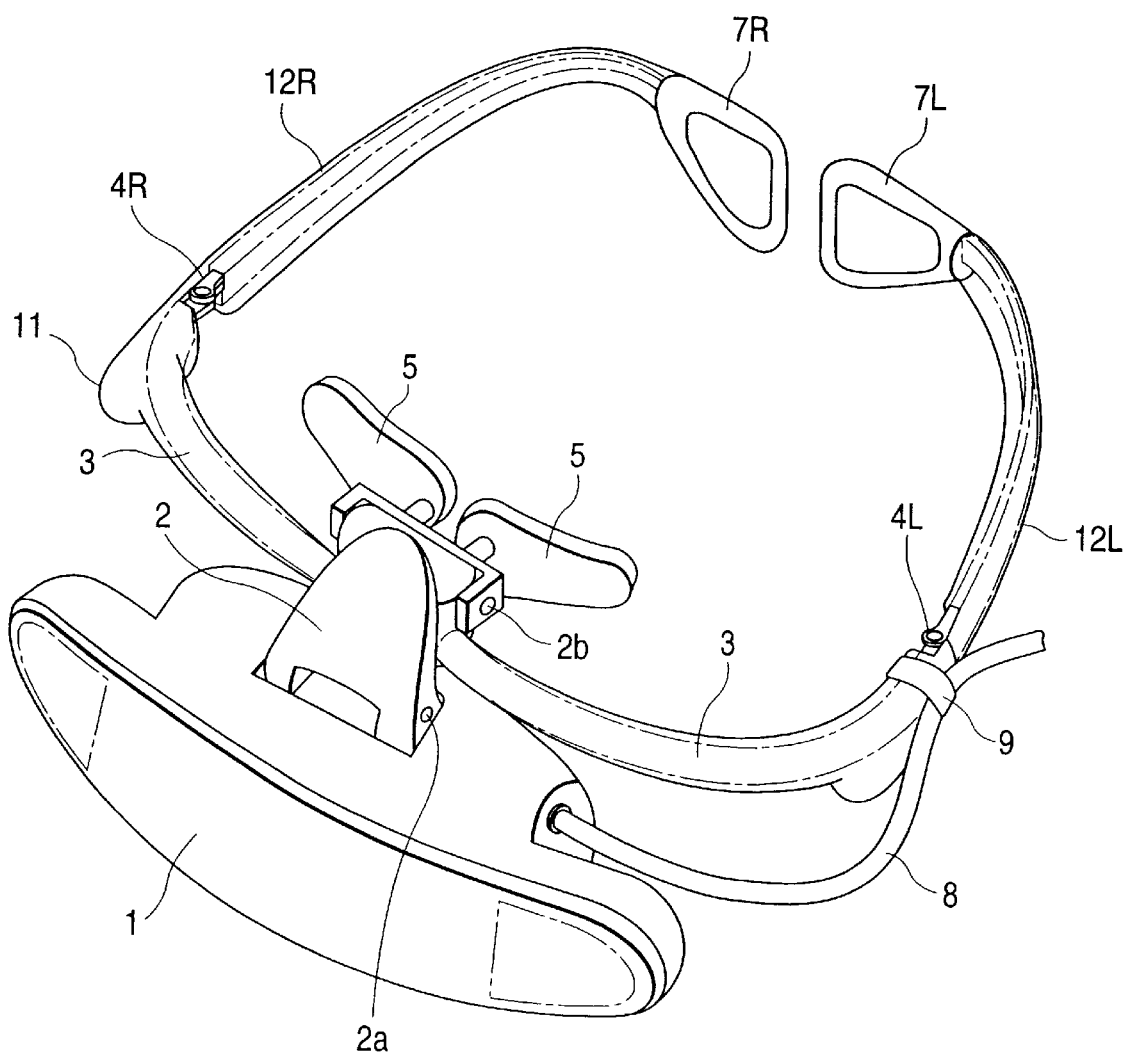
FIG. 6 is a perspective view of the second embodiment of the present invention.

FIG. 6 is a perspective view of the second embodiment. In this embodiment, the front frame 3 and the side frames 6L and 6R of the second embodiment are coated with an elastomer or the like. The same reference numerals in the second embodiment denote the same parts as in the first embodiment. A coating frame 11 is formed on a front frame 3 by insert molding with polyester elastomer. Likewise, coating frames 12L and 12R are formed on side frames 6L and 6R by insert molding with polyester elastomer. Each of the side frames 6L and 6R is coated with the elastomer and bent to have a predetermined biasing force.

With this arrangement, since no metal portion protrudes outside, the frames come into contact with the head with a soft feel. Even if, therefore, a person having an allergy to metals wears the display for a relatively long period of time of several tens of minutes to several hours, he/she can safely use the display without any problem. In addition, if a hook 9 for fixing a cable is integrally formed on the coating frame 12L, the display appears tidy in terms of design and function. This increases the degree of freedom in design and can realize a smart appearance that gives the user confidence in terms of strength. Furthermore, if the side frames 6L and 6R and the coating frames 12L and 12R are integrally formed by molding with an elastomer or the like, the overall weight of the apparatus can be decreased.

Figure 7:
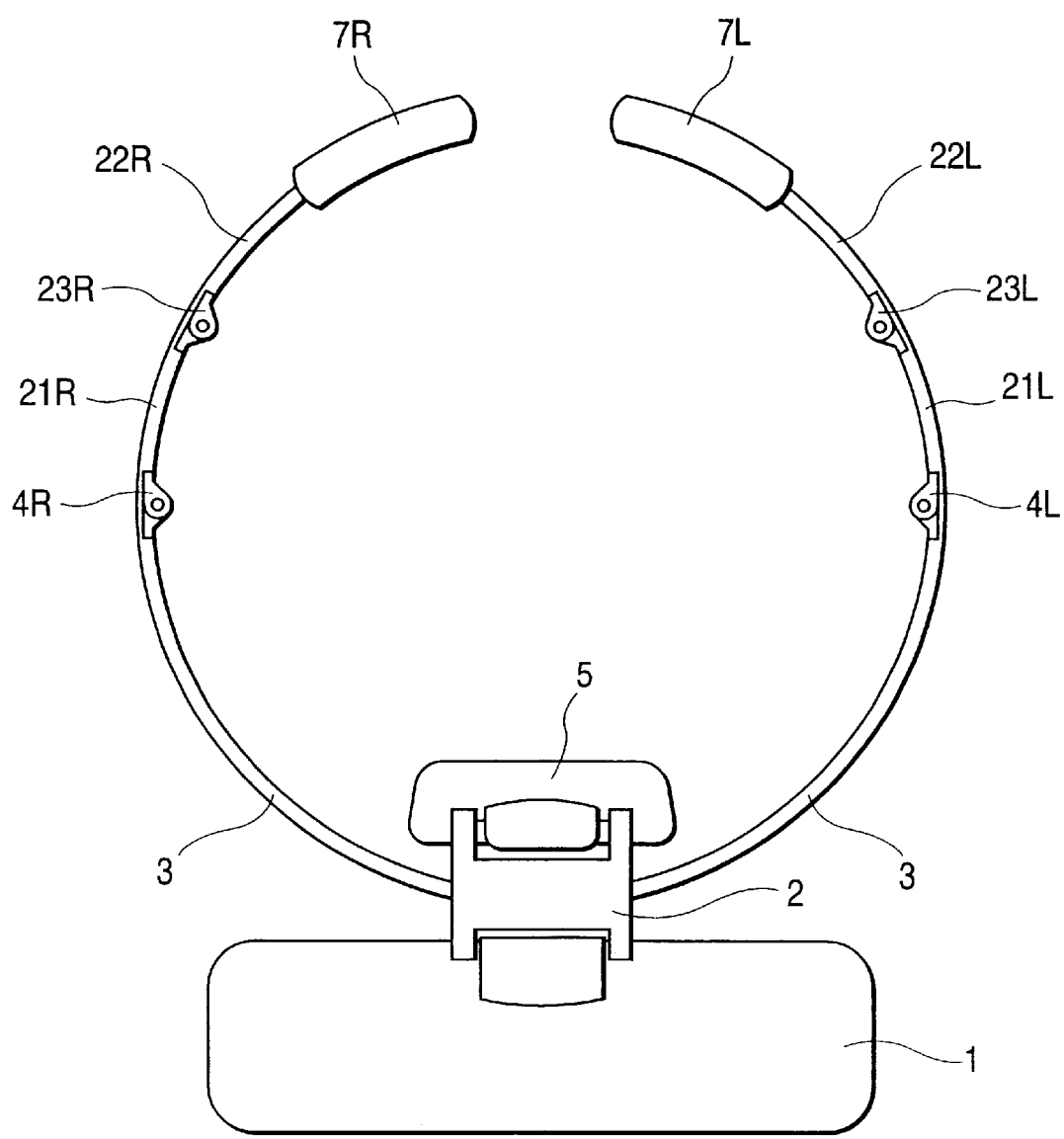
FIG. 7 is a plan view of the third embodiment of the present invention.

FIG. 7 is a plan view schematically showing the third embodiment. The same reference numerals in this embodiment denote the same parts as in the first embodiment. The side frames 6L and 6R of the first embodiment are divided into first side frames 21L and 21R and second side frames 22L and 22R. These frames are coupled to each other through second hinges 23L and 23R. For example, the side frames 21L, 21R, 22L, and 22R are made of a stainless steel alloy, titanium, a titanium alloy, or a super-elastic alloy and are bent inwardly to the direction of the head. One end of each of the first side frames 21L and 21R is axially supported by a corresponding one of first hinges 4L and 4R to be pivotal within a predetermined angular range with respect to a front frame 3. The other end of each of the first side frames 21L and 21R is axially supported by a corresponding one of the second hinges 23L and 23R to be rotatable within a predetermined angular range with respect to a corresponding one of the first side frames 21L and 21R.

The first hinges 4L and 4R are mounted at positions where the first side frames 21L and 21R are located on the extended lines of the first hinges 4L and 4R and the end faces of the front frame 3 come into contact with the end faces of the first side frames 21L and 21R. The first side frames 21L and 21R cannot be spread outwardly from the extended lines of the front frame 3 but can be folded inwardly.

Likewise, the second hinges 23L and 23R are mounted at positions where the second side frames 22L and 22R are located on the extended lines of the first side frames 21L and 21R and the end faces of the first side frames 21L and 21R come into contact with the end faces of the second side frames 22L and 22R. The second side frames 22L and 22R cannot be spread outwardly from the extended lines of the first side frames 21L and 21R but can be folded inwardly.

When the user wants to wear the head mount display, he/she unfolds the first and second side frames 21L, 21R, 22L, and 22R that are bent inwardly, and fixes the display on his/her head while rear pads 7L and 7R press the head with, in particular, the biasing force generated by the second side frames 22L and 22R.

Figure 8:
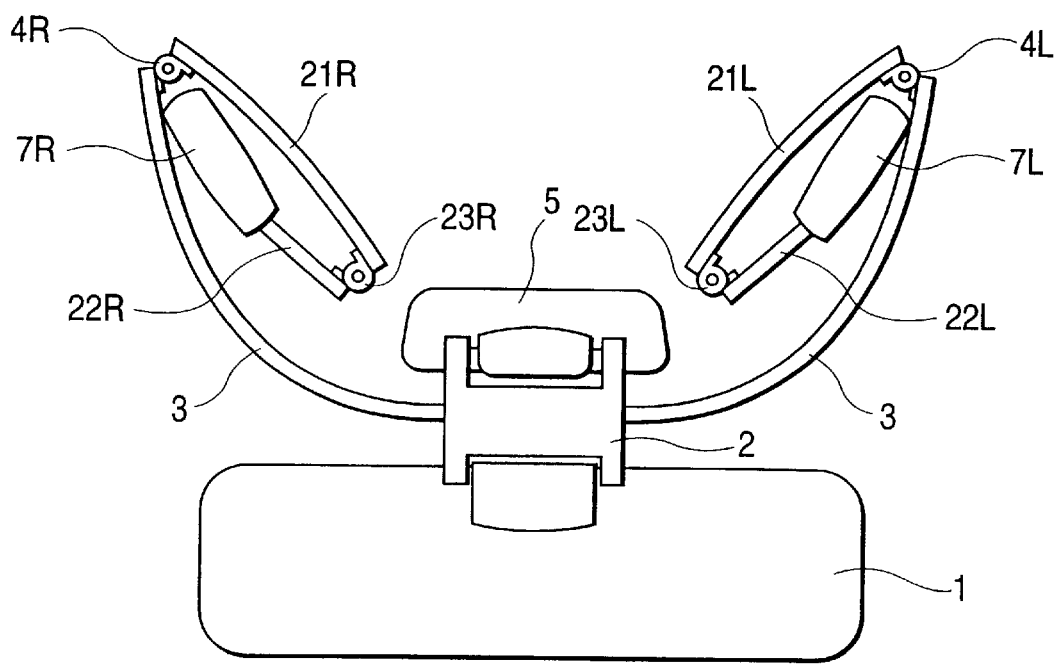
FIG. 8 is a plan view of the embodiment in a folded state.

When the head mount display is not used, the first and second side frames 21L, 21R, 22L, and 22R can be folded inwardly at the first hinges 4L and 4R and the second hinges 23L and 23R, as shown in FIG. 8. This makes the display compact and improves the portability.

In place of the first side frames 21L and 21R, other elastic members, e.g., rubber or spring members, can be used.

Figure 9:
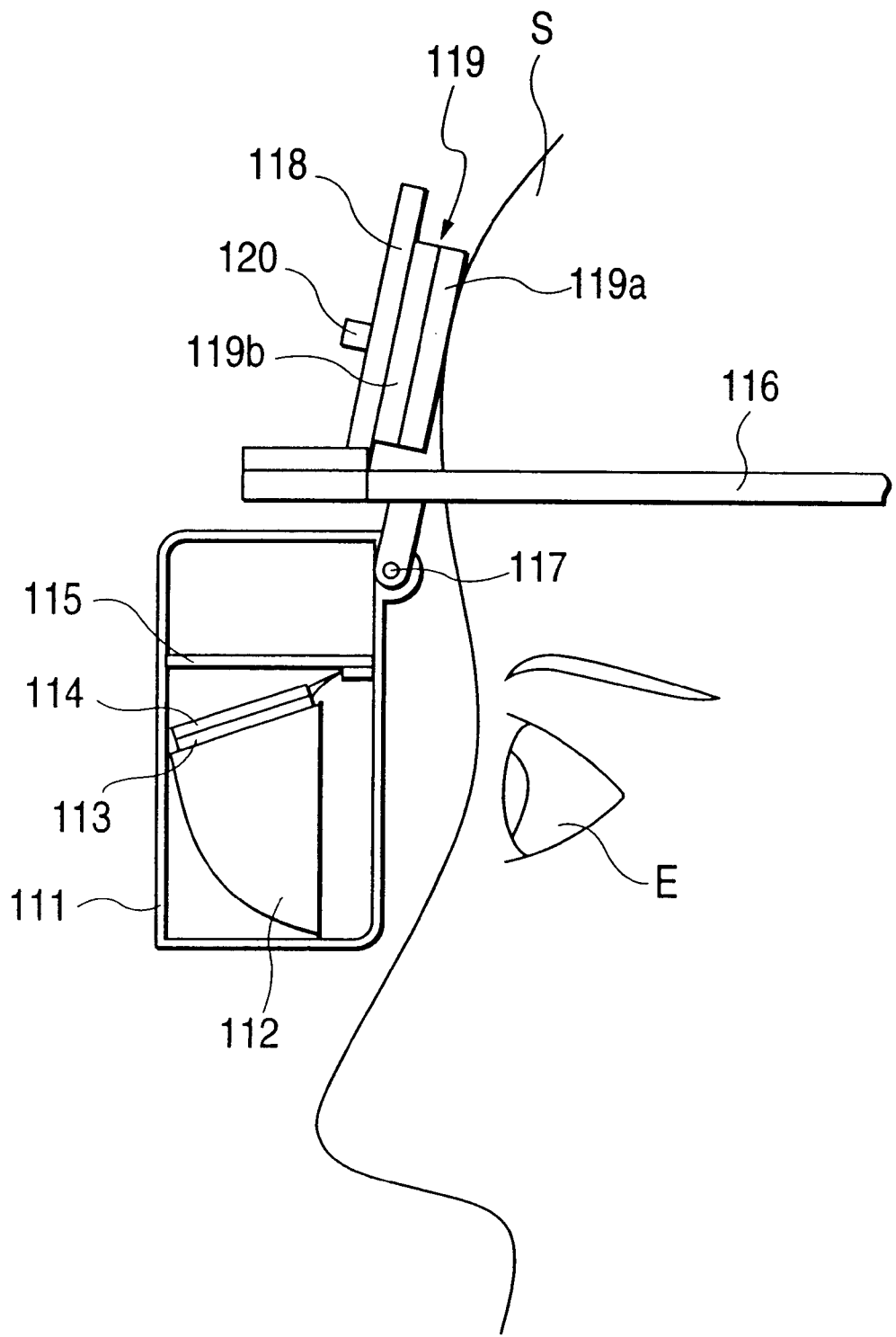
FIG. 9 is a sectional view of the fourth embodiment before visual axis adjustment.
Figure 10:
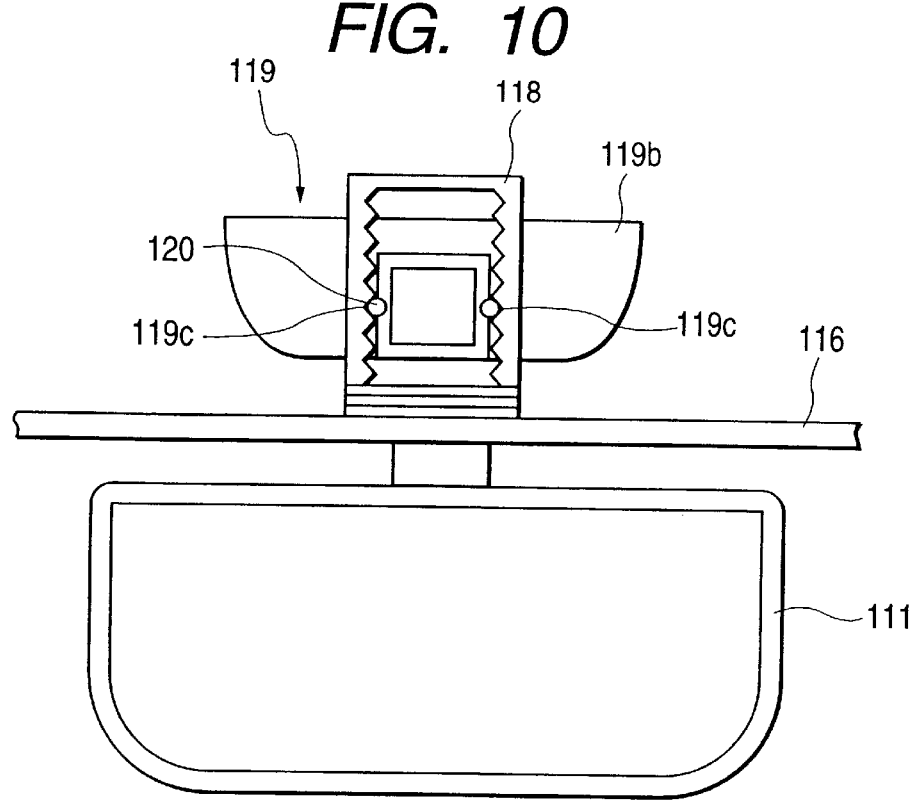
FIG. 10 is a front view of the embodiment.
Figure 11:
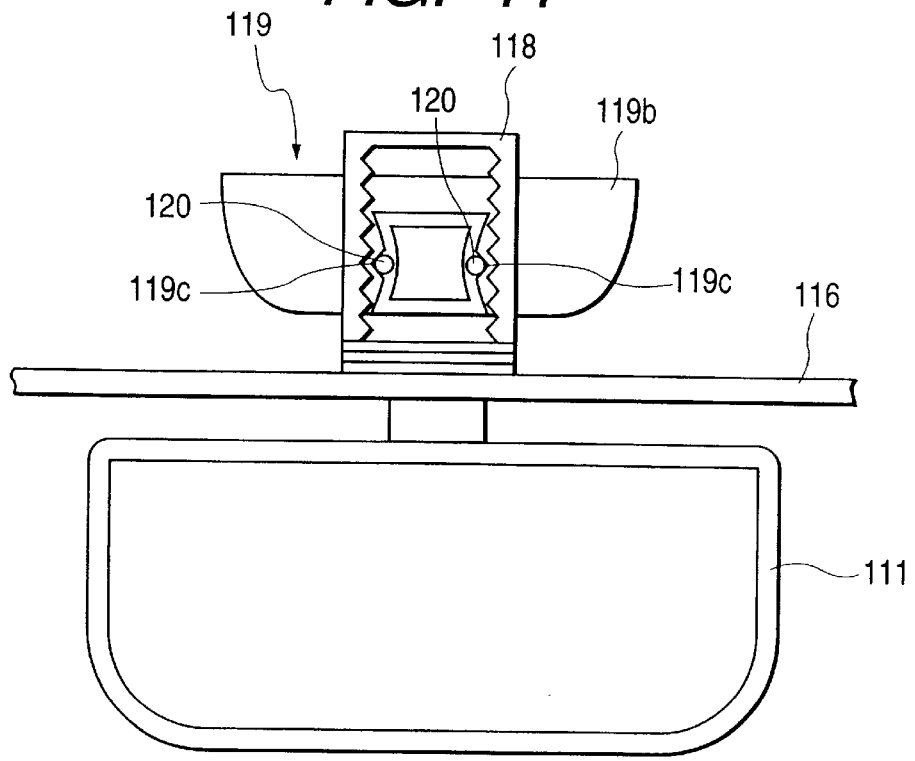
FIG. 11 is a front view of the embodiment in a knob adjustment state.
Figure 12:
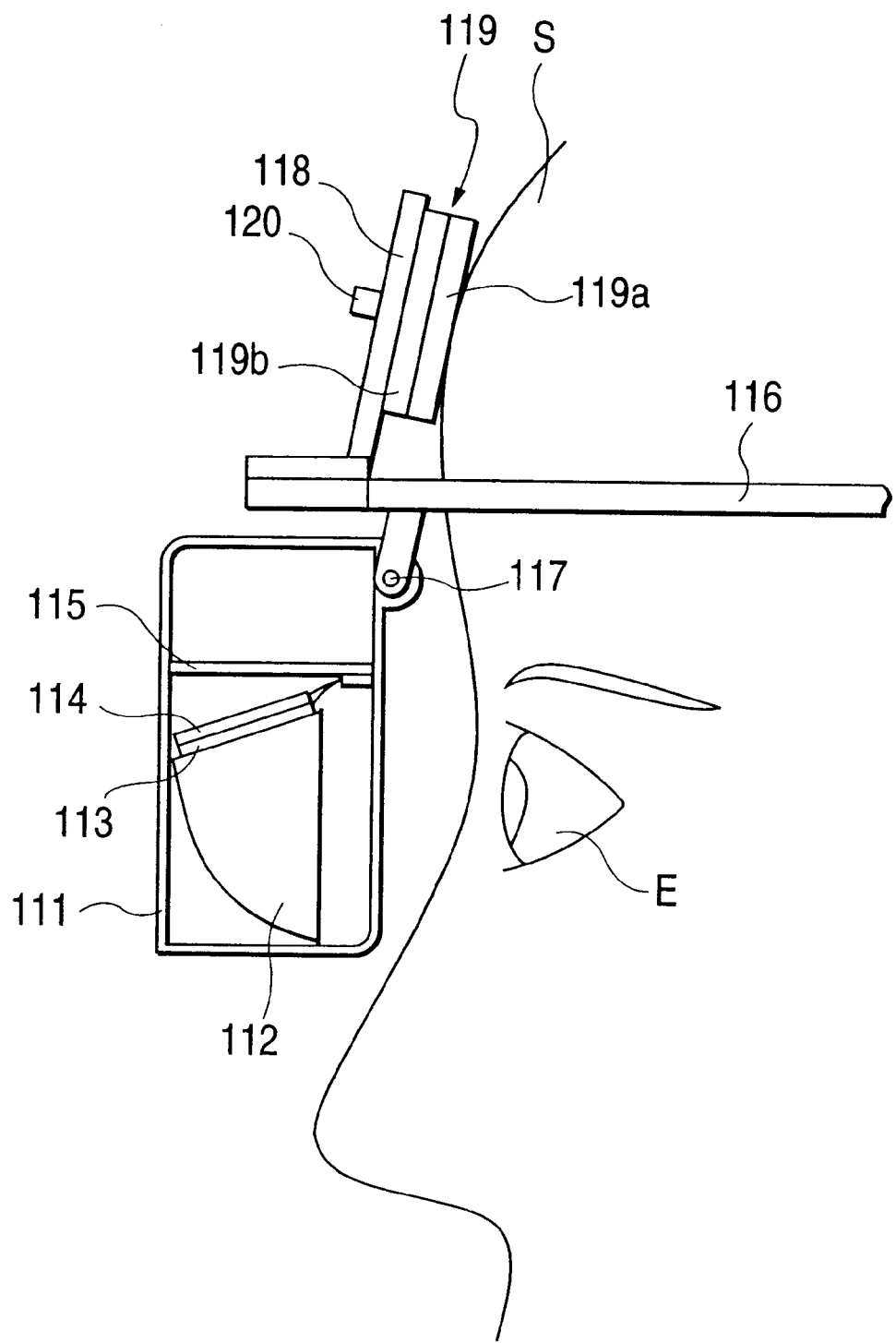
FIG. 12 is a sectional view of the embodiment after visual axis adjustment.
Figure 13:
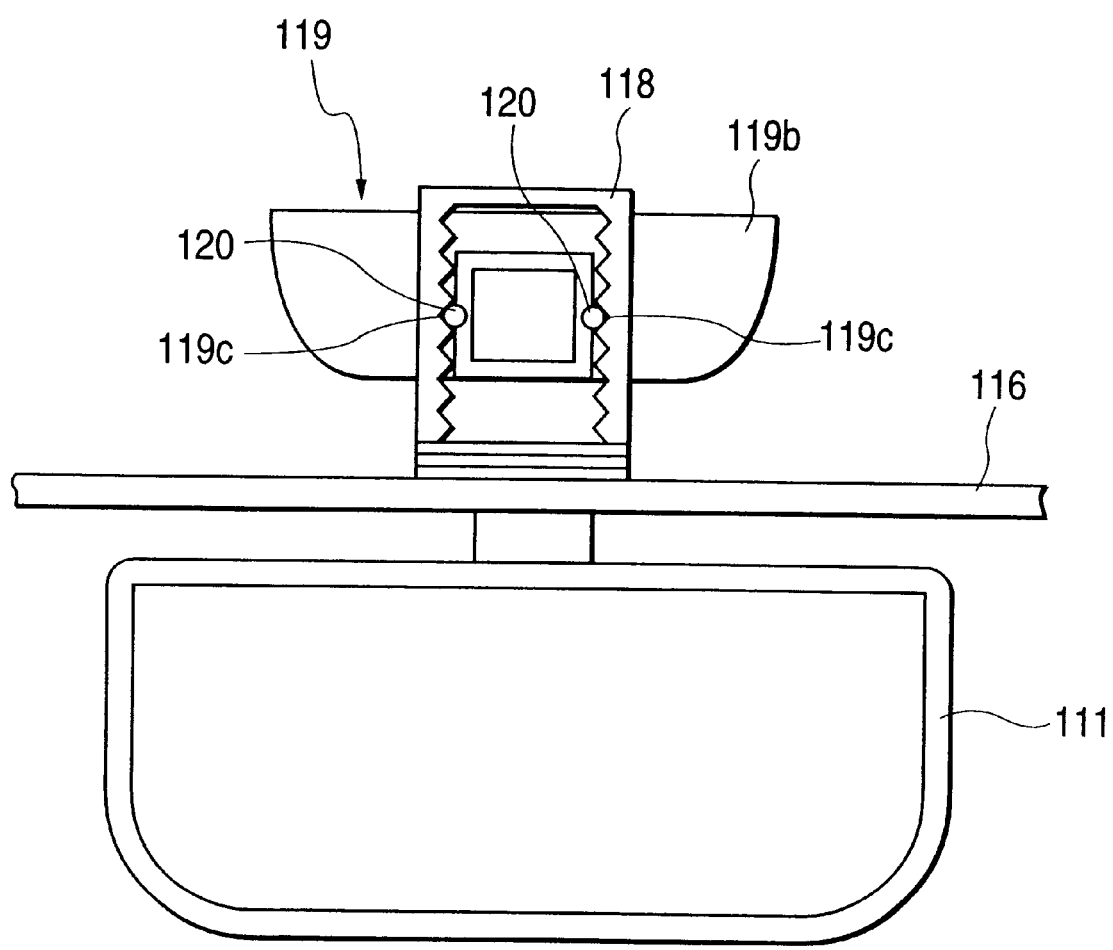
FIG. 13 is a front view of the embodiment.

FIGS. 9 to 13 show the fourth embodiment. FIG. 9 is a sectional view of the embodiment before visual axis adjustment. FIG. 10 is a front view of the embodiment. FIG. 11 is a front view of the embodiment in the process of visual axis adjustment. FIG. 12 is a sectional view of the embodiment after visual axis adjustment. FIG. 13 is a front view of the embodiment. A display unit 111 of the head mount display incorporates a prism 112 including a total reflection mirror, an image display means 113, an illumination means 114, and an electric circuit board 115. The electric circuit board 115 is connected to the image display means 113 and the illumination means 114 through a wire harness, flexible cable, or the like. A mount frame 116 that supports the display unit 111 is made of an elastic material such as a metal or synthetic resin. If a metal is used, heat can be dissipated from the display unit 111. The display unit 111 is held on a hinge portion 117 and coupled to the mount frame 116 to be vertically pivotal.

A base 118 is mounted on the mount frame 116. The base 118 is fixed with screws or an adhesive, by welding, or the like. If the mount frame 116 is a molded product made of a synthetic resin, the mount frame 116 and the base 118 can be integrally molded. The base 118 has a frame-like shape with a plurality of recesses formed in its inner surface. In addition, marks such as the numbers 1, 2, and 3, the letters A, B, and C, or the like may be printed or inscribed on a portion near the recesses/projections of the base 118.

A forehead pad 119 is fixed to the base 118. The forehead pad 119 is comprised of a pad 119*a* made of an elastic material such as a rubber or foamed sponge material and a pad base 119*b*. The pad 119*a* and the pad base 119*b* are joined to each other with an adhesive, double-sided adhesive tape, or the like. The pad base 119*b* has two projections 119*c* that conform to the recesses/projections in the inner surface of the base 118 and engage with the recesses/projections of the base 118 to be held. Two adjustment knobs 120 are formed near the projections of the base 118. To move the forehead pad 119, the user exerts external forces on the adjustment knobs 120 in the directions in which the adjustment knobs 120 come close to each other. As a result, as shown in FIG. 11, the projections 119*c* of the pad base 119*b* move from the recesses/projections of the base 118 and engage with arbitrary recesses/projections of the base 118, as shown in FIGS. 12 and 13.

Assume that an observer S wants to adjust the image display unit to the upper visual axis after he/she wears the display. In this case, the observer moves the display unit 111 upward by moving the forehead pad 119 upward with respect to the base 118, thereby adjusting the display unit 111. The image displayed on the image display means 113 is illuminated by the illumination means 114. This image light strikes the prism 112 including the total reflection mirror. As a result, an enlarged virtual image reaches an observer's eye E, and the observer S can visually check the enlarged image with an optimal visual axis.

Figure 14:
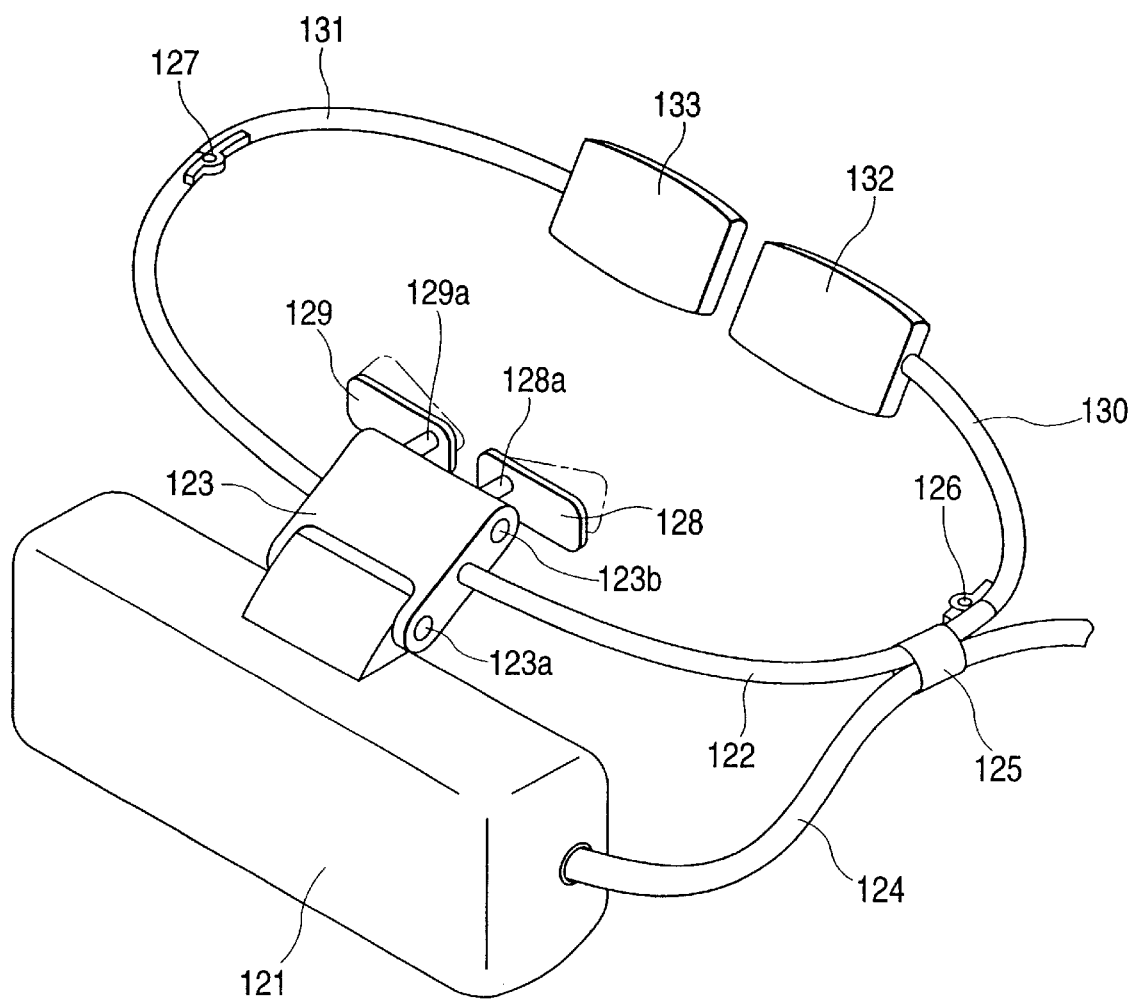
FIG. 14 is a perspective view of the fifth embodiment of the present invention.
Figure 15:
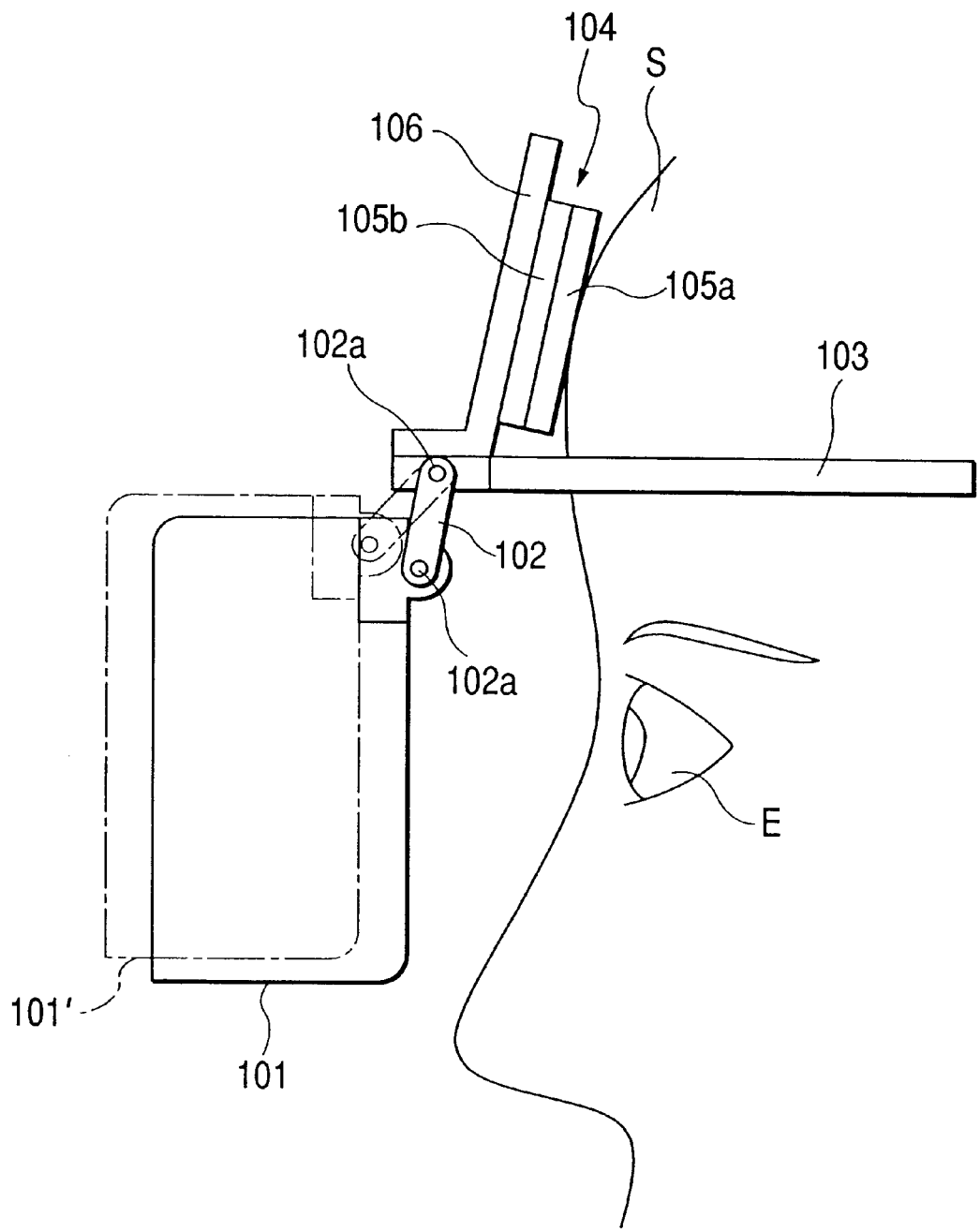
FIG. 15 is a side view of the display unit of the prior art.

FIG. 14 is a perspective view of the fifth embodiment. In the fourth embodiment, the forehead pad 119 slides on the display unit 111. In the fifth embodiment, the forehead pad is divided into two parts, which are pivoted to change the vertical positions of the display unit and the forehead pads.

A display unit 121 incorporates a backlight, a liquid crystal panel, a display circuit, and an optical means. The display unit 121 is mounted on a mount frame 122 through a support member 123. The output of the display unit 121 is connected to a signal source such as a video tape deck or personal computer (not shown) through a cable 124. The cable 124 is fixed to the mount frame 122 with a hook 125. For example, the mount frame 122 is formed by bending a titanium rod member and has a shape almost conforming to the front surface of the head of a user. The support member 123 made of a synthetic resin or titanium is fixed to substantially the middle of the mount frame 122 with screws or the like. First and second hinges 126 and 127 are mounted on the two ends of the mount frame 122 by brazing, caulking, or the like.

The support member 123 has first and second rotating shafts 123*a* and 123*b*. The first rotating shaft 123*a* axially supports the display unit 121 to allow it to rotate back and forth with a predetermined frictional force. The second rotating shaft 123*b* axially supports first and second forehead pads 128 and 129 through pivots 128*a* and 129*a* to allow the pads to vertically pivot within predetermined angular ranges. The pivots 128*a* and 129*a* allow the first and second forehead pads 128 and 129 to pivot within a plane roughly perpendicular to the visual axis. The pivots 128*a* and 129*a* are supported by clicks or the like such that their positions are selectively determined.

Each of first and second cranes 130 and 131 made of stainless steel alloy, titanium, a titanium alloy, or a super-elastic alloy is coupled to the other end of each of hinges 126 and 127. The hinges 126 and 127 respectively allow the cranes 130 and 131 to rotate within predetermined angular ranges with respect to the mount frame 122. In addition, each of first and second pads 132 and 133 for the back of the head is mounted on the other end of each of the cranes 130 and 131.

The first and second hinges 126 and 127 are mounted at positions where the first and second cranes 130 and 131 are located on the extended lines of the mount frame 122 and the end faces of the mount frame 122 come into contact with the end faces of the first and second cranes 130 and 131. The first and second cranes 130 and 131 cannot be spread outwardly from the extended lines of the mount frame 122 but can be folded inwardly.

With this arrangement, the user can easily wear the display unit 121 like glasses. If the user wearing the display feels that the visual axis does not match the height of the display unit 121, he/she selects and sets the rotating positions of the first and second forehead pads 128 and 129 to proper positions, thereby practically changing the vertical positions at which the forehead pads 128 and 129 come into contact with the forehead of the user. This allows the forehead pads to conform to the shape of the face or head of any user. When video based on an electrical signal from a video signal generating means such as a video tape deck (not shown) is displayed on the display unit 121 after the position of the display unit 121 is adjusted to the optimal position in this manner, the observer can see the enlarged video.

What is claimed is:

1. A head mount display comprising:

a display unit having a display element and optical means for enlarging/displaying an image on said display element;

a first frame extending substantially conforming to a forehead of a user;

first support portion mounted on said first frame at a predetermined angle; and support means for supporting said display unit on said first frame, wherein said first frame is formed by bending a metal rod, metal pipe, or metal plate, first and second hinges are mounted on two end portions of said first frame, the other end of each of said first and second hinges supports a corresponding one of first and second side frames, which respectively have second and third support portions, have shapes bent inwardly, and have elasticity in a direction in which said first and second side frames bend, to allow each of said side frames to rotate in a direction of the head, and said first, second, and third support portions are biased with biasing forces produced by spreading said first and second side frames, thereby producing a force that allows said first, second and third support portions to be worn on the head.

2. A display according to claim 1, wherein cross-sectional areas of portions of said first and second side frames which are located near the end portions where said first and second hinges are mounted are larger than those of the remaining portions.

3. A display according to claim 2, wherein cross-sectional shapes of said first and second side frames are formed with cross-sectional areas decreasing, at least at portions near the end portions where said first and second hinges are mounted, in a direction of length.

4. A display according to any one of claims 1 to 3, wherein said first and second side frames are made of a metal.

5. A display according to claim 4, wherein the metal is a stainless steel alloy.

6. A display according to claim 4, wherein the metal is a titanium alloy.

7. A display according to claim 4, wherein the metal is a super-elastic alloy.

8. A display according to any one of claims 1 to 3, wherein said first and second side frames are made an elastomer.

9. A display according to claim 1, wherein said first frame is made of a titanium alloy.

10. A head mount display comprising:

a display unit having a display element and optical means for enlarging/displaying an image on said display element;

a first frame extending substantially conforming to a forehead of a user;

first support portion mounted on said first frame at a predetermined angle; and support means for supporting said display unit on said first frame, wherein said first frame is formed by coating a core member obtained by bending a metal rod, metal pipe, or metal plate with a resin film, first and second hinges are mounted on two end portions of said first frame, the other end of each of said first and second hinges supports a corresponding one of first and second side frames, which respectively have second and third support portions, have shapes bent inwardly, and have elasticity in a direction in which said first and second side frames bend, to allow each of said side frames to rotate in a direction of the head, and said first, second, and third support portions are biased with biasing forces produced by spreading said first and second side frames, thereby producing a force that allows said first, second and third support portions to be worn on the head.

11. A display according to claim 10, wherein cross-sectional areas of portions of said first and second side frames which are located near the end portions where said first and second hinges are mounted are larger than those of the remaining portions.

12. A display according to claim 11, wherein cross-sectional shapes of said first and second side frames are formed with cross-sectional areas decreasing, at least at portions near the end portions where said first and second hinges are mounted, in a direction of length.

13. A display according to any one of claims 10 to 12, wherein said first and second side frames have cores made of a metal.

14. A display according to claim 13, wherein the metal is a stainless steel alloy.

15. A display according to claim 13, wherein the metal is a titanium alloy.

16. A display according to claim 13, wherein the metal is a super-elastic alloy.

17. A display according to any one of claims 10 to 12, wherein said first and second side frames are made of an elastomer.

18. A display according to claim 10, wherein said first frame has a core member made of a titanium alloy.

19. A head mount display comprising:
a display unit having a display element and optical means for enlarging/displaying an image on said display element;
a first frame extending substantially conforming to a forehead of a user;
first support portion mounted on said first frame at a predetermined angle; and
support means for supporting said display unit on said first frame,
wherein said first frame is formed by bending a metal rod, metal pipe, or metal plate, first and second hinges are mounted on two end portions of said first frame, the other end of each of said first and second hinges supports a corresponding one of first and second side frames, which have shapes bent inwardly and have elasticity in a direction in which said first and second side frames bend, to allow each of said side frames to rotate in a direction of the head, said first and second side frames respectively have third and fourth hinges mounted on end portions different from the end portions coupled to said first and second hinges, first and second press members respectively having second and third support portions are respectively supported on said third and fourth hinges to be rotatable in a direction of the head, and said first, second, and third support portions are biased with biasing forces produced by spreading said first and second side frames, thereby producing a force that allows said first, second and third support portions to be worn on the head.

20. A display according to claim 19, wherein cross-sectional areas of portions of said first and second side frames which are located near the end portions where said first and second hinges are mounted are larger than those of the remaining portions.

21. A display according to claim 20, wherein cross-sectional shapes of said first and second side frames are formed with cross-sectional areas decreasing, at least at portions near the end portions where said first and second hinges are mounted, in a direction of length.

22. A display according to any one of claims 19 to 21, wherein said first and second side frames are made of a metal.

23. A display according to claim 22, wherein the metal is a stainless steel alloy.

24. A display according to claim 22, wherein the metal is a titanium alloy.

25. A display according to claim 22, wherein the metal is a super-elastic alloy.

26. A display according to any one of claims 19 to 21, wherein said first and second side frames are made of an elastomer.

27. A display according to claim 19, wherein said first frame is made of a titanium alloy.

28. A head mount display comprising:
a display unit having a display element and optical means for enlarging/displaying an image on said display element;
a first frame extending substantially conforming to a forehead of a user;
first support portion mounted on said first frame at a predetermined angle; and
support means for supporting said display unit on said first frame,
wherein said first frame is formed by bending a metal rod, metal pipe, or metal plate, first and second hinges are mounted on two end portions of said first frame, the other end of each of said first and second hinges supports a corresponding one of first and second side frames, which have shapes bent inwardly and have elasticity in a direction in which said first and second side frames bend, to allow each of said side frames to rotate in a direction of the head, said first and second side frames respectively have first and second elastic members mounted on end portions different from the end portions coupled to said first and second hinges, first and second press members respectively having second and third support portions are respectively supported on said first and second elastic members to be foldable in a direction of the head, and said first, second, and third support portions are biased with biasing forces produced by spreading said first and second side frames, thereby producing a force that allows said first, second and third support portions to be won on the head.

29. A display according to claim 28, wherein said first and second elastic members are made of a super-elastic alloy.

30. A display according to claim 28, wherein cross-sectional areas of portions of said first and second side frames which are located near the end portions where said first and second hinges are mounted are larger than those of the remaining portions.

31. A display according to claim 30, wherein cross-sectional shapes of said first and second side frames are formed with cross-sectional areas decreasing, at least at portions near the end portions where said first and second hinges are mounted, in a direction of length.

32. A display according to any one of claims 28, 30, and 31, wherein said first and second side frames are made of a metal.

33. A display according to claim 32, wherein the metal is a stainless steel alloy.

34. A display according to claim 32, wherein the metal is a titanium alloy.

35. A display according to claim 32, wherein the metal is a super-elastic alloy.

36. A display according to any one of claims 28, 30, and 31, wherein said first and second side frames are made of an elastomer.

37. A display according to claim 28, wherein said first frame is made of a titanium alloy.

38. A head mount display comprising:
a display unit having a display element and optical means for enlarging/displaying an image on said display element;

a first frame extending substantially conforming to a forehead of a user;

a first support portion mounted on said first frame at a predetermined angle; and support means for supporting said display unit on said first frame, wherein first and second hinges are mounted on two end portions of said first frame, the other end of each of said first and second hinges supports a corresponding one of first and second side frames, which respectively have second and third support portions, have shapes bend inwardly, and have elasticity in a direction in which said first and second side frames bend, to allow each of said side frames to rotate in a direction of the head, and said first, second and third support portions are biased with biasing forces produced by spreading said first and second side frames, thereby producing a force that allows said first, second and third support portions to be worn on the head.

39. A head mount display comprising:

a display unit having a display element and optical means for enlarging/displaying an image on said display element;

a first frame extending substantially conforming to a forehead of a user;

a first support portion mounted on said first frame at a predetermined angle; and support means for supporting said display unit on said first frame, wherein said first and second hinges are mounted on two end portions of said first frame, the other end of each of said first and second hinges supports a corresponding one of first and second side frames, which have shapes bent inwardly and have elasticity in a direction in which said first and second side frames bend, to allow each of said side frames to rotate in a direction of the head, said first and second side frames respectively have third and fourth hinges mounted on end portions different from the end portions coupled to said first and second hinges, first and second press members respectively having second and third support portions are respectively supported on said third and fourth hinges to be rotatable in a direction of the head, and said first, second and third support portions are biased with biasing forces produced by spreading said first and second side frames, thereby producing a force that allows said first, second and third support portions to be worn on the head.

40. A head mount display comprising:

a display unit having a display element and optical means for enlarging/displaying an image on said display element;

a first frame extending substantially conforming to a forehead of a user;

first support portion mounted on said first frame at a predetermined angle; and support means for supporting said display unit on said first frame, wherein first and second hinges are mounted on two end portions of said first frame, the other end of each of said first and second hinges supports a corresponding one of first and second side frames, which have shapes bent inwardly and have elasticity in a direction in which said first and second side frames bend, to allow each of said side frames to rotate in a direction of the head, said first and second side frames respectively have first and second elastic members mounted on end portions different from the end portions coupled to said first and second hinges, first and second press members respectively having second and third support portions are respectively supported on said first and second elastic members to be foldable in a direction of the head, and said first, second and third support portions are biased with biasing forces produced by spreading said first and second side frames, thereby producing a force that allows said first, second and third support portions to be worn on the head.

41. A head mount display comprising:

a display unit having a display element and optical means for enlarging/displaying an image on said display element;

a frame having an arc shape extending along a head of a user from a forehead to an occipital, said frame having elasticity inwardly thereof;

a first support portion mounted on said frame at a predetermined angle, said first support portion adapted to come into contact with the forehead of the user;

second and third support portions mounted on two end portions of said frame, said second and third support portions adapted to come into contact with the occipital of the user; and support means for supporting said display unit on said frame, wherein said first, second and third support portions are biased with biasing forces produced by spreading said frame, thereby producing a force that allows said first, second and third support portions to be worn on the head.

* * * * *

UNITED STATES PATENT AND TRADEMARK OFFICE
CERTIFICATE OF CORRECTION

PATENT NO. : 6,388,640 B1
DATED : May 14, 2002
INVENTOR(S) : Tatsuo Chigira et al.

It is certified that error appears in the above-identified patent and that said Letters Patent is hereby corrected as shown below:

Column 3,
Line 56, "biasing" (2nd occurrence) should read -- force required to mount the display by using the biasing --.

Column 4,
Line 62, "force" should read -- fourth --.

Signed and Sealed this

Twenty-sixth Day of November, 2002

Attest:

Attesting Officer

JAMES E. ROGAN
Director of the United States Patent and Trademark Office